United States Patent
Zingler et al.

(10) Patent No.: US 10,159,019 B2
(45) Date of Patent: Dec. 18, 2018

(54) IMPROVING OVERALL NETWORK PERFORMANCE AND/OR OVERALL QUALITY OF SERVICE OF USER EQUIPMENTS IN A MOBILE COMMUNICATION NETWORK

(71) Applicant: Deutsche Telekom AG, Bonn (DE)

(72) Inventors: Olaf Zingler, Bonn (DE); Frank Lehser, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 61 days.

(21) Appl. No.: 15/315,389

(22) PCT Filed: Jun. 2, 2015

(86) PCT No.: PCT/EP2015/062189
§ 371 (c)(1),
(2) Date: Dec. 1, 2016

(87) PCT Pub. No.: WO2015/185518
PCT Pub. Date: Dec. 10, 2015

(65) Prior Publication Data
US 2017/0201912 A1    Jul. 13, 2017

(30) Foreign Application Priority Data
Jun. 3, 2014 (EP) .................... 14170914

(51) Int. Cl.
*H04W 36/00* (2009.01)
*H04W 36/08* (2009.01)
*H04W 24/02* (2009.01)

(52) U.S. Cl.
CPC ....... *H04W 36/0061* (2013.01); *H04W 24/02* (2013.01); *H04W 36/08* (2013.01)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS

2008/0089293 A1* 4/2008 Madour ............ H04W 36/0016
370/331
2008/0259869 A1* 10/2008 Wang ................ H04W 36/02
370/331
(Continued)

FOREIGN PATENT DOCUMENTS

EP          2624630 A1    8/2013
WO     2012116723 A1    9/2012

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Standard; 3GPP TS 36.300, 3rd Generation Partnership Project (3GPP) vol. RAN WG2, No. V12.1.0, Mar. 19, 2014 (Mar. 19, 2014), pp. 1-209, XP50769957.

*Primary Examiner* — Melvin C Marcelo
*Assistant Examiner* — Sanjay K Dewan
(74) *Attorney, Agent, or Firm* — Leydig, Voit & Mayer, Ltd.

(57) ABSTRACT

A method for improving overall network performance and/or overall quality of service of user equipments in a mobile communication network includes in a first step, a base station entity, prior to executing a requested handover procedure, requests a user equipment to decode a cell global identifier of the target radio cell; in a second step, subsequent to the first step, the base station entity receives the decoded cell global identifier reported by the user equipment; and in a third step, subsequent to the second step, the base station (Continued)

entity determines which of further radio cells having the target physical cell identifier information and the target center frequency corresponds to the target radio cell, and initiates the handover procedure towards the target radio cell.

10 Claims, 1 Drawing Sheet

(56) References Cited

U.S. PATENT DOCUMENTS

| | | |
|---|---|---|
| 2009/0170519 A1* | 7/2009 | Wilhoite ........... H04M 3/42246 455/436 |
| 2009/0190554 A1* | 7/2009 | Cho ...................... H04L 1/1874 370/331 |
| 2009/0257402 A1* | 10/2009 | Zhu ...................... H04W 36/08 370/331 |
| 2010/0234028 A1 | 9/2010 | Narasimha et al. |
| 2012/0063414 A1* | 3/2012 | Ramachandran ........................... H04W 36/0022 370/331 |
| 2012/0243510 A1* | 9/2012 | Takano ............... H04W 74/004 370/331 |
| 2016/0205608 A1* | 7/2016 | Cho ...................... H04L 1/1874 370/331 |

\* cited by examiner

IMPROVING OVERALL NETWORK PERFORMANCE AND/OR OVERALL QUALITY OF SERVICE OF USER EQUIPMENTS IN A MOBILE COMMUNICATION NETWORK

CROSS-REFERENCE TO RELATED APPLICATIONS

This application is a U.S. National Phase application under 35 U.S.C. § 371 of International Application No. PCT/EP2015/062189, filed on Jun. 2, 2015, and claims benefit to European Patent Application No. EP 14170914.7, filed on Jun. 3, 2014. The International Application was published in English on Dec. 10, 2015 as WO 2015/185518 A1 under PCT Article 21(2).

FIELD

The present invention relates a method for improving overall network performance and/or overall quality of service of user equipments in a mobile communication network.

Furthermore, the present invention relates to a system and a mobile communication network for improving overall network performance and/or overall quality of service of user equipments in a mobile communication network.

Furthermore, the present invention relates to a program and to a computer program product for improving overall network performance and/or overall quality of service of user equipments in a mobile communication network.

The present invention relates to the area of cell related planning and optimization of mobile networks or mobile communication networks.

BACKGROUND

Mobile communication networks typically use one standard or a plurality of standards for mobile communication such as the so-called GSM standard (Global System for Mobile communication), the GPRS standard (General Packet Radio System), the UMTS standard (Universal Mobile Telecommunication System) or the LTE (Long term evolution) standard.

For the LTE standard and as well for the UMTS standard, the standardization organization 3GPP has defined so-called ANR functionalities (Automatic Neighbor Relationship) to identify and organize neighbor relationships among cells which is the basis for mobility of mobile device (user equipments) within the mobile communication network or parts thereof.

One basic pre-requisite and assumption for the use of ANR functionalities, but generally also for mobility of user equipments within the mobile communication network, is that an information that is assigned, by the operator of the mobile communication network, to a radio cell is unique, and hence it is possible to identify that radio cell, at least on a local level (i.e. not necessarily network-wide). This information is often referred to as the so-called physical cell identifier information or PCI (Physical Cell Identifier): it identifies the radio cell of the mobile communication network as a short identifier but, at least in general, it is not (necessarily) unique regarding the complete mobile communication network (i.e. network-wide).

At the very least, the assumption should be verified—in view of using ANR functionalities—that the pair of values of:

the physical cell identifier information, and
the center frequency is locally unique to identify that radio cell, i.e. on a local level within the mobile communication network (i.e. not necessarily network-wide), it should be possible to unambiguously identify any radio cell via the physical cell identifier information and the center frequency.

However, due to the fact that the number of possible physical cell identifier values is limited (e.g. limited to 504 different values according to the LTE standard), and especially in complex network situations involving a plurality of network layers, the problem of a confusion and/or of conflicts regarding the physical cell identifier information and/ or regarding the pair of values of the physical cell identifier information and the center frequency (so-called PCI confusions or PCI conflicts) occur.

In contrast to the physical cell identifier information assigned to the radio cells of the mobile communication network, the cell global identifier information (also called CGI, Cell Global Identifier) is a unique identifier for a radio cell, i.e. its knowledge enables to precisely identify the radio cell (at least network-wide, if not globally). However, the cell global identifier information is a more extensive information than the physical cell identifier information (typically being "longer", i.e. comprising a higher number of digits) and, especially due to this property, is not read (i.e. decoded or received), by a standard user equipment and at least not in any case, for the purposes of normal mobility measurements, i.e. in case that the user equipment detects that the radio link with the serving base station entity becomes weaker (and the radio signals of another base station entity of another radio cell becomes stronger) and hence a handover procedure could be required.

Accordingly, situations of a confusion and/or of conflicts regarding the physical cell identifier information (and/or regarding the physical cell identifier information and the center frequency) often result in a reduced level of quality of service provided by the mobile communication network to the respective users of the mobile devices or user equipments, lead to a reduced mobility in the mobile communication network and might end up in a dropped connection of the mobile device or user equipment.

SUMMARY

In an exemplary embodiment, the present invention provides a method for improving overall network performance and/or overall quality of service of user equipments in a mobile communication network. The mobile communication network comprises a core network and an access network. The access network comprises at least one base station entity serving the user equipment. A serving radio cell is associated with the base station entity corresponding to the radio coverage area of the base station entity. Further radio cells are located in the vicinity of the serving radio cell. The serving radio cell as well as the plurality of further radio cells use, respectively, a center frequency. A physical cell identifier information as well as a unique cell global identifier information is assigned, respectively, to the serving radio cell and to each of the further radio cells. The method comprises: in case that the user equipment reports a downlink signal strength and/or downlink signal quality situation such that a handover is likely to be performed under control of the base station entity towards a target radio cell based on indicating both the target physical cell identifier information and a target center frequency of the target radio cell, and additionally, in case that at least two radio cells of the further radio cells have an identical target physical cell identifier information and an identical target center frequency such that a determination of a correct target radio cell among the at least two radio cells of the further radio cells for handover is not possible based on solely the target physical cell identifier information and the target center frequency of the target radio cell, in a first step, the base station entity, prior to executing a requested handover procedure, requests the user equipment to decode the cell global identifier of the target radio cell; in a second step, subsequent to the first step, the base station entity receives the decoded cell global identifier reported by the user equipment; and in a third step, subsequent to the second step, the base station entity determines which one of the at least two radio cells of the further radio cells, having the target physical cell identifier information and the target center frequency, corresponds to the target radio cell, and initiates the handover procedure towards the target radio cell.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention avoid situations of a confusion and/or of conflicts regarding the physical cell identifier information (and/or regarding the physical cell identifier information and the center frequency), thereby improving overall network performance and/or overall quality of service as well as reducing battery drain of mobile devices in situations or circumstances where this can be avoided.

In an exemplary embodiment, the present invention provides a method for improving overall network performance and/or overall quality of service of user equipments in a mobile communication network, wherein the mobile communication network comprises a core network and an access network, wherein the access network comprises at least one base station entity serving the user equipment, wherein a serving radio cell is associated to the base station entity corresponding to the radio coverage area of the base station entity, wherein further radio cells are located in the vicinity of the serving radio cell, wherein the serving radio cell as well as the plurality of further radio cells use, respectively, a center frequency, wherein a physical cell identifier information as well as a unique cell global identifier information is assigned, respectively, to the serving radio cell and to each of the further radio cells, wherein in case that the user equipment reports a downlink signal strength and/or downlink signal quality situation such that a handover is likely to be performed under control of the base station entity towards a target radio cell based on indicating both the target physical cell identifier information and the target center frequency of the target radio cell, and additionally, in case that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell, the method comprises the following steps:

in a first step, the base station entity prior to executing the requested handover procedure requests the user equipment to decode the cell global identifier of the target radio cell, in a second step, subsequent to the first step, the user equipment reports the cell global identifier to the base station entity, in a third step, subsequent to the second step, the base station entity determines which one of the at least two radio cells of the further radio cells, having the target physical cell identifier information and the target center frequency, corresponds to the target radio cell, and initiates the handover procedure towards the target radio cell.

It is thereby advantageously possible according to the present invention that situations of a confusion and/or of conflicts regarding the physical cell identifier information (and/or regarding the physical cell identifier information and the center frequency) can be handled as best as possible, and hence the overall network performance and/or overall quality of service as well as the battery usage of mobile devices enhanced (especially by increasing the cases of error-free forwarding of user equipments to the target cell that has really been measured by the user equipment). According to the present invention, it is advantageously possible that, e.g., continuous checking of the PCI confusion situation by continuous CGI measurements can be avoided as this would cost end customer performance, especially in terms of: DRX gaps, additional needed time of the procedure and battery power. According to the present invention, these negative effects can be controlled such as to minimize negative end customer impact as much as possible.

In the context of the present invention, in order to enhance overall network performance of a mobile communication network as much as possible, radio cells that can be identified, on a local level (i.e. in comparably small parts of the mobile communication network), by their physical cell identifier and their center frequency should be locally unique to allow such an identification of the radio cell. This means that in the surrounding (radio cells) of a source cell there should not be cells with the same pair of physical cell identifier (PCI) and center frequency (same as the observed radio cells as well as the neighbor cells shall not have the same values of the PCI and the center frequency). This is not the case in situations of a physical cell identifier collision or in situations of a physical cell identifier confusion.

In the context of the present invention, cases of conflicting physical cell identifier information (relating to mobile communication networks according to the LTE standard) are referred to. However, in case of mobile communication networks according to the UMTS standard, the same type of conflict occurs with respect to primary downlink scrambling codes. According to the present invention, an application of the inventive method for mobile communication networks according to the UMTS standard can be realized by exchanging "physical cell identifier" or "pair of physical cell identifier and center frequency" by "primary downlink scrambling code" or "pair of primary downlink scrambling code and center frequency".

A situation of a collision regarding the physical cell identifier information (i.e. a situation of a PCI-Collision) corresponds to the situation that for a specific radio cell (cell A), a direct neighbor radio cell (cell B) of the specific radio cell has the same PCI value. A handover procedure (i.e. a correct handover based on the procedures according to the 3GPP standardization) from the specific radio cell (cell A) to the direct neighbor radio cell (cell B) is not possible (or at least not possible in case that the center frequency of both radio cells is identical).

A situation of a confusion regarding the physical cell identifier information (i.e. a situation of a PCI-Confusion) (with regard to a specific cell) corresponds to the situation that two cells that are neighbors of a specific cell (two neighbor cells B and C of a cell A) have the same pair of physical cell identifier and center frequency values. A handover between the specific cell (cell A) and both the neighbor cells (cells B or C) is possible (i.e. between cells A and B and between cells A and C) but not between the two neighboring cells (i.e. cells B and C or vice versa).

According to the present invention it is preferred that the first step is executed only either:
  in case that the handover success rate associated with the target physical cell identifier information and the target center frequency is determined to be lower than a predetermined success rate threshold value, or
  in case that the target physical cell identifier is part of a predetermined set of physical cell identifiers , or
  in case that the target physical cell identifier and the corresponding center frequency is part of a predetermined set of physical cell identifiers and corresponding center frequencies, or
  in case that the target physical cell identifier and the corresponding center frequency is part of a predetermined set of physical cell identifiers and corresponding center frequencies and related to a specific public land mobile network, or
  in case that a field strength and/or network quality indicator measured by the user equipment or serving base station entity undercuts a predetermined first network quality threshold and/or in case that a timing advance indicator measured by the serving base station entity and related to the connection to the user equipment exceeds a predetermined first timing advance threshold, or
  in case that a field strength and/or network quality indicator measured by the user equipment or serving base station entity exceeds a predetermined second network quality threshold and/or in case that a timing advance indicator measured by the serving base station entity and related to the connection to the user equipment undercuts a predetermined second timing advance threshold, or
  in case that other functionalities regarding automatic neighbor relationship provides an indication that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell.

According to a further embodiment of the present invention, it is also possible and preferred that the first step of the inventive method is executed only in case that two of the above mentioned conditions are met, or in case that only three of the above mentioned conditions are met.

According to the present invention, it is advantageously possible that such situations can be handled within the mobility purpose of a mobile communication network and to operate the mobile communication network, if necessary with acceptable restrictions/disadvantages, until the network operator has solved the physical cell identifier conflicts (physical cell identifier collisions and/or physical cell identifier confusions), if possible, or an automatic functionality solves these issues. The impact on the end customer of the mobile communication network with respect to call drops and throughput performance limitations can thereby be limited as much as possible.

According to the first above mentioned condition, the first step of the inventive method is executed in case that the handover success rate associated with the target physical cell identifier information and the target center frequency is determined to be lower than a predetermined success rate threshold value. For situations of physical cell identifier confusion or physical cell identifier collision, handover success rates might drop as much as approaching 50% only (as about half of the handover attempts are directed to the wrong radio cell (due to the physical cell identifier confusion) and hence fail). This means that according to the present invention, a first measure to take in case of a determination of such a comparably low handover success rate is to request the user equipment to perform the determination of the cell global identifier, i.e. to perform the first step of the inventive method.

Especially, it is preferred according to the present invention that the first step of the inventive method is executed in case that the handover success rate associated with the target physical cell identifier information and the target center frequency is determined to be lower than a predetermined success rate threshold value and the mobile network operator cannot exclude PCI confusion as possible reason of such a comparably low success rate. According to such an embodiment of the inventive method, the execution of CGI measurements is restricted only to cases where it is likely that a PCI confusion does exist.

According to the present invention, it is also possible and preferred that the cell global identifier is requested to be determined (i.e. the first step of the inventive method performed) in case that the handover success rate drops below a success rate threshold value of another value (than 50%), such as below 60% or below 70% or below 80% or below 90%.

According to the second above mentioned condition, the first step of the inventive method is executed in case that the target physical cell identifier is part of a predetermined set of physical cell identifiers, i.e. if the measured PCI value reported by the user equipment is a part of a dedicated, configured list or of a range of PCI values, the first step of the inventive method is executed; i.e. the serving base station entity (or the mobile network operator) explicitly requests the user equipment to perform a CGI decoding if the reported falls in the configured list or the range of PCI values. This might be due to the fact that it cannot be assured that an environment free of PCI conflicts exists in the surrounding network (e.g. in the vicinity of the federal borderline or in heterogeneous network (HetNet) scenarios.

According to the third above mentioned condition, the first step of the inventive method is executed in case that the target physical cell identifier and the corresponding center frequency is part of a predetermined set of physical cell identifiers and corresponding center frequencies, i.e. if the measured PCI value and center frequency value reported by the user equipment is a part of a dedicated, configured list or of a range of such combinations of PCI values and center frequencies, the first step of the inventive method is executed; i.e. the serving base station entity (or the mobile network operator) explicitly requests the user equipment to perform a CGI decoding if the reported falls in the configured list or the range of combinations of PCI values and center frequencies. This might be due to the fact that it cannot be assured that an environment free of PCI conflicts exists in the surrounding network (e.g. in the vicinity of the federal borderline or in heterogeneous network (HetNet) scenarios.

According to the fourth above mentioned condition, the first step of the inventive method is executed in case that the target physical cell identifier and the corresponding center frequency is part of a predetermined set of physical cell identifiers and corresponding center frequencies and related to a specific public land mobile network, i.e. if the measured PCI value and center frequency value reported by the user equipment is a part of a dedicated, configured list or of a range of such combinations of PCI values and center frequencies and being connected to a public land mobile network, the first step of the inventive method is executed; i.e. the serving base station entity (or the mobile network operator) explicitly requests the user equipment to perform a CGI decoding if the reported falls in the configured list or the range of combinations of PCI values and center frequencies and are connected to a public land mobile network.

According to the fifth above mentioned condition, the first step of the inventive method is executed in case that a field strength and/or network quality indicator measured by the user equipment or serving base station entity undercuts a predetermined first network quality threshold and/or in case that a timing advance indicator measured by the serving base station entity and related to the connection to the user equipment exceeds a predetermined first timing advance threshold.

According to the sixth above mentioned condition, the first step of the inventive method is executed in case that a field strength and/or network quality indicator measured by the user equipment or serving base station entity exceeds a predetermined second network quality threshold and/or in case that a timing advance indicator measured by the serving base station entity and related to the connection to the user equipment undercuts a predetermined second timing advance threshold.

According to the seventh above mentioned condition, the first step of the inventive method is executed in case that other functionalities regarding automatic neighbor relationship provides an indication that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell.

According to the present invention it is furthermore preferred that the method comprises, prior to the first step, a step of recognizing or anticipating the situation that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell It is thereby advantageously possible according to the present invention that prior to conducting the first step of the inventive method, it is established that the situation really applies (that at least two radio cells of the further radio cells have the identical target physical cell identifier information and the identical target center frequency).

Thereby, it is advantageously possible according to the present invention that the step of requesting the user equipment to decode the cell global identifier is only performed in case that it is necessary or in case that such additional decoding of the cell global identifier provides additional benefits in view of improving overall network performance and/or overall quality of service of user equipments in the mobile communication network.

According to a further preferred embodiment of the present invention, in case that
  at least two radio cells of the further radio cells had the identical target physical cell identifier information and the identical target center frequency at a first point in time
  but the confusion regarding the identical target physical cell identifier information and the identical target center frequency has been resolved at a second point in time, subsequent to the first point in time,
the execution of the first step is avoided even in case that the handover success rate associated with the target physical cell identifier information and the target center frequency is determined to be lower than a predetermined success rate threshold value.

Thereby, it is advantageously possible to avoid the detection of the cell global identifier in situations where additionally performing the detection of the cell global identifier would not help to improve overall network performance and/or overall quality of service of user equipments in the mobile communication network.

According to the present invention it is furthermore preferred that the base station entity generates a list of potential target cells for handover procedures, the list of potential target cells comprising at least a subset of the further radio cells.

It is thereby advantageously possible that the list of potential target cells for handover procedures correspond to the list of neighbor cells that is typically generated executing the automatic neighbor relations within the mobile communication network.

According to a further preferred embodiment of the present invention, in case that the list of potential target cells for handover procedures comprises an entry corresponding to a radio cell belonging to an unsupported mobile communication network and having a physical cell identifier and a center frequency identical to one of the further radio cells, then either this entry of the list of potential target cells for handover procedures is changed to pointing to the one of the further radio cells, or a further entry of the list of potential target cells for handover procedures is generated pointing to the one of the further radio cells.

It is thereby advantageously possible to easily update the list of potential target cells and to enhance the network performance and/or overall quality of service of user equipments in the mobile communication network.

Furthermore, the present invention relates to a system for improving overall network performance and/or overall quality of service of user equipments in a mobile communication network, wherein the system comprises a user equipment and a mobile communication network comprising a core network and an access network, wherein the access network comprises at least one base station entity serving the user equipment, wherein a serving radio cell is associated to the base station entity corresponding to the radio coverage area of the base station entity, wherein further radio cells are located in the vicinity of the serving radio cell, wherein the serving radio cell as well as the plurality of further radio cells use, respectively, a center frequency, wherein a physical cell identifier information as well as a unique cell global identifier information is assigned, respectively, to the serving radio cell and to each of the further radio cells, wherein in case that the user equipment reports a downlink signal strength and/or downlink signal quality situation such that a handover is likely to be performed under control of the base station entity towards a target radio cell based on indicating both the target physical cell identifier information and the target center frequency of the target radio cell, and additionally, in case that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell, wherein the system is configured such that:

the base station entity—prior to executing the requested handover procedure requests the user equipment to decode the cell global identifier of the target radio cell, the user equipment reports the cell global identifier to the base station entity, the base station entity determines which one of the at least two radio cells of the further radio cells, having the target physical cell identifier information and the target center frequency, corresponds to the target radio cell, and initiates the handover procedure towards the target radio cell.

Thereby, it is advantageously possible to provide a system that is capable of handling situations of a confusion and/or of conflicts regarding the physical cell identifier information (and/or regarding the physical cell identifier information and the center frequency) in an effective manner, and enhance the overall network performance and/or overall quality of service as well as the battery usage of mobile devices. According to the present invention, it is advantageously possible that, e.g., continuous checking of the PCI confusion situation by continuous CGI measurements can be avoided as this would cost end customer performance, especially in terms of: DRX gaps, additional needed time of the procedure and battery power.

According to the present invention it is furthermore preferred especially with respect to the inventive system—that the system is configured such that the cell global identifier is only requested to be decoded by the user equipment if either one of the following is verified:

in case that the handover success rate associated with the target physical cell identifier information and the target center frequency is determined to be lower than a predetermined success rate threshold value, or in case that the target physical cell identifier is part of a predetermined set of physical cell identifiers, or in case that the target physical cell identifier and the corresponding center frequency is part of a predetermined set of physical cell identifiers and corresponding center frequencies, or in case that the target physical cell identifier and the corresponding center frequency is part of a predetermined set of physical cell identifiers and corresponding center frequencies and related to a specific public land mobile network, or in case that a field strength and/or network quality indicator measured by the user equipment or serving base station entity undercuts a predetermined first network quality threshold and/or in case that a timing advance indicator measured by the serving base station entity and related to the connection to the user equipment exceeds a predetermined first timing advance threshold, or in case that a field strength and/or network quality indicator measured by the user equipment or serving base station entity exceeds a predetermined second network quality threshold and/or in case that a timing advance indicator measured by the serving base station entity and related to the connection to the user equipment undercuts a predetermined second timing advance threshold, or in case that other functionalities regarding automatic neighbor relationship provides an indication that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell.

According to a further embodiment of the present invention, it is also possible and preferred that the system is configured such that the cell global identifier is only requested to be decoded by the user equipment only in case that two of the above mentioned conditions are met, or in case that only three of the above mentioned conditions are met.

According to still another preferred embodiment of the present invention, the system is configured such that the base station entity generates a list of potential target cells for handover procedures, the list of potential target cells comprising at least a subset of the further radio cells.

Furthermore, the present invention relates to a mobile communication network for improving overall network performance and/or overall quality of service of user equipments in the mobile communication network, wherein the mobile communication network comprises a core network and an access network, wherein the access network comprises at least one base station entity serving the user equipment, wherein a serving radio cell is associated to the base station entity corresponding to the radio coverage area of the base station entity, wherein further radio cells are located in the vicinity of the serving radio cell, wherein the serving radio cell as well as the plurality of further radio cells use, respectively, a center frequency, wherein a physical cell identifier information as well as a unique cell global identifier information is assigned, respectively, to the serving radio cell and to each of the further radio cells, wherein in case that the user equipment reports a downlink signal strength and/or downlink signal quality situation such that a handover is likely to be performed under control of the base station entity towards a target radio cell based on indicating both the target physical cell identifier information and the target center frequency of the target radio cell, and additionally, in case that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell, wherein the mobile communication network is configured such that:

the base station entity prior to executing the requested handover procedure requests the user equipment to decode the cell global identifier of the target radio cell, the user equipment reports the cell global identifier to the base station entity, the base station entity determines which one of the at least two radio cells of the further radio cells, having the target physical cell identifier information and the target center frequency, corresponds to the target radio cell, and initiates the handover procedure towards the target radio cell.

Thereby, it is advantageously possible to provide a mobile communication network adapted to handle situations of a confusion and/or of conflicts regarding the physical cell identifier information (and/or regarding the physical cell identifier information and the center frequency) in an effective manner. According to the present invention, it is advantageously possible that, e.g., continuous checking of the PCI confusion situation by continuous CGI measurements can be avoided.

According to the present invention it is furthermore preferred especially with respect to the inventive mobile communication network that the mobile communication network is configured such that the cell global identifier is only requested to be decoded by the user equipment if either one of the following is verified:

in case that the handover success rate associated with the target physical cell identifier information and the target center frequency is determined to be lower than a predetermined success rate threshold value, or in case that the target physical cell identifier is part of a predetermined set of physical cell identifiers, or in case that the target physical cell identifier and the corresponding center frequency is part of a predetermined set of physical cell identifiers and corresponding center frequencies, or in case that the target physical cell identifier and the corresponding center frequency is part of a predetermined set of physical cell identifiers and corresponding center frequencies and related to a specific public land mobile network, or in case that a field strength and/or network quality indicator measured by the user equipment or serving base station entity undercuts a predetermined first network quality threshold and/or in case that a timing advance indicator measured by the serving base station entity and related to the connection to the user equipment exceeds a predetermined first timing advance threshold, or in case that a field strength and/or network quality indicator measured by the user equipment or serving base station entity exceeds a predetermined second network quality threshold and/or in case that a timing advance indicator measured by the serving base station entity and related to the connection to the user equipment undercuts a predetermined second timing advance threshold, or in case that other functionalities regarding automatic neighbor relationship provides an indication that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell.

According to a further embodiment of the present invention, it is also possible and preferred that the mobile communication network is configured such that the cell global identifier is only requested to be decoded by the user equipment only in case that two of the above mentioned conditions are met, or in case that only three of the above mentioned conditions are met.

Additionally, the present invention relates to a program comprising a computer readable program code which, when executed on a computer or on a base station entity or on a network node of a mobile communication network, or in part on the base station entity and in part on the network node of the mobile communication network, causes the computer or the base station entity or the network node of the mobile communication network to perform the inventive method.

Still additionally, the present invention relates to a computer program product for using a user equipment with a base transceiver station, the computer program product comprising a computer program stored on a storage medium, the computer program comprising program code which, when executed on a computer or on a base station entity or on a network node of a mobile communication network, or in part on the base station entity and in part on the network node of the mobile communication network, causes the computer or the base station entity or the network node of the mobile communication network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
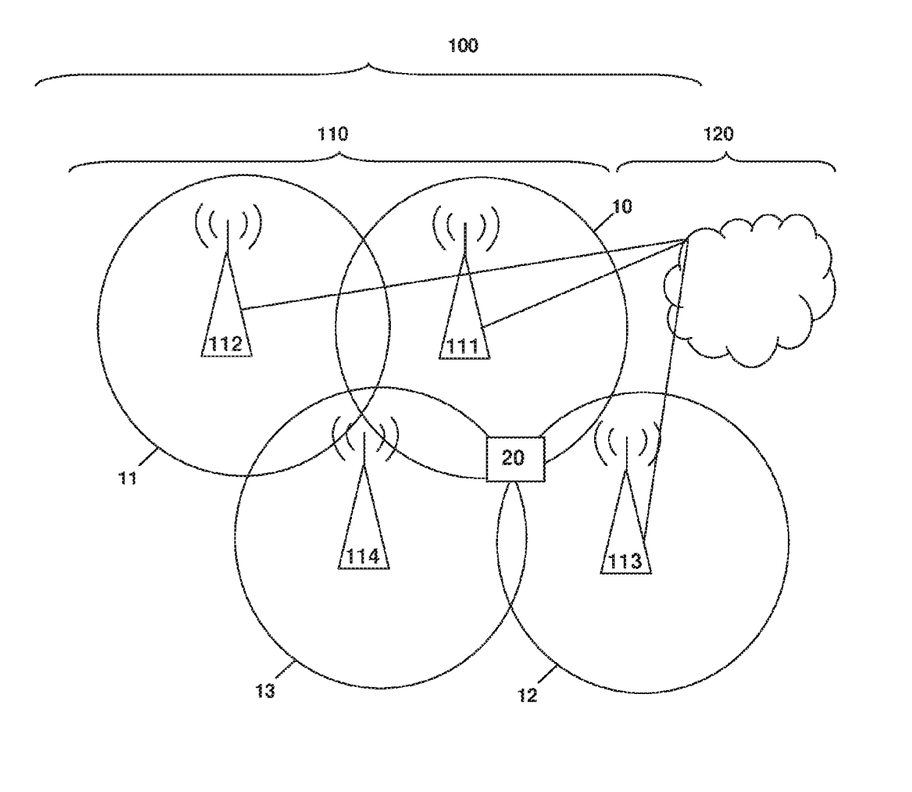
FIG. 1 schematically illustrates a mobile communication network comprising a multitude of radio cells being served by a multitude of base station entities, and a user equipment being served by the serving base station entity, the other base station entities being potential target base station entities for a handover procedure involving the user equipment.

In FIG. 1, a mobile communication network 100, especially a public land mobile network 100, is schematically shown, the mobile communication network 100 comprising an access network 110 and a core network 120. The mobile communication network 100 is preferably a cellular telecommunications network comprising typically a plurality of network cells, wherein four radio cells are represented in FIG. 1 by means of reference signs 10, 11, 12, and 13: a first radio cell 10, a second radio cell 11, a third radio cell 12, and a fourth radio cell 13. The access network 110 comprises at least one base station entity 111 serving a user equipment 20, wherein the first radio cell 10 corresponds to a serving radio cell 10 and is associated to the base station entity 111. The first radio cell 10 corresponds to the radio coverage area of the base station entity 111. The second, third and fourth radio cells are further radio cells 11, 12, 13 and are located in the vicinity of the serving radio cell 10. In the context of the present invention, the premise is that in the mobile communication network 100, the first user equipment 20 is camping on the mobile communication network 100 within the serving radio cell 10, i.e. the first user equipment 20 is connected to or camping on the base station entity 111 serving the first (or serving) radio cell 10. Furthermore, a first neighbor base station entity 112 serving the second radio cell 11, a second neighbor base station entity 113 serving the third radio cell 12, and a third neighbor base station entity 113 serving the fourth radio cell 13 are schematically shown. The second, third, and fourth radio cells 11, 12, 13 are—with respect to the serving radio cell 10 further radio cells or potential target cells for a handover procedure involving the user equipment 20.

The serving radio cell 10 (i.e. the corresponding base station entity 111) as well as the plurality of further radio cells 11, 12, 13 (i.e. the corresponding base station entities 112, 113, 114) use, respectively, a center frequency. Furthermore, a physical cell identifier information as well as a unique cell global identifier information is assigned, respectively, to the serving radio cell 10 and to each of the further radio cells 11, 12, 13.

Typically, the base station entities (eNodeB) are setup such that target cells or potential target cells for mobility purposes are stored in a list per base station entity (or eNodeB) (or per cell of an eNodeB), the so-called neighbor list. This list of potential target cells (for handover procedures) includes target cells (already used or only measured and therefore, more seen as a kind of candidate) with several mandatory parameters like, the PCI of the target cell, its configured downlink center frequency or downlink frequency channel, the Cell Global Identity information (as an unique worldwide identifier) and the address how this target cell can be reached by the serving base station entity. Such information includes, e.g., the IP address of the MME, which handles the further routing of the call (mobility is then covered via the S1 interface) or the ID-address or addresses of the control plane or the control and user plane (being typically dependent on the supported 3GPP releases of the eNodeB software), as well as firewall settings (ACL (Access control list) rules).

According to the 3GPP standardization, the CGI is decoded and transmitted from the user equipment towards the serving base station entity (or eNodeB) to link the measured pair of PCI and center frequency with the CGI of the measured cell behind, a typically worldwide unique identifier of a LTE mobile network cell (based on 3GPP standard).

Within the procedures to provide seamless mobility in a mobile network, the eNodeB receives field strength and/or other radio network quality related measurements together with the PCI/center frequency of surrounding cells (with respect to the serving cell). The eNodeB tries to join this pair of PCI and center frequency with the available content of the list of potential target cells for handover procedures (neighbor list). Based on the IP-address of the so identified cell or the CGI of the linked entry within the list, a handover preparation procedure is initiate either directly to the neighbored target cell (eNodeB) via the X2 interface or via the MME above the S1 interface.

Due to the implemented method of the CGI collection, if a single or several user equipments are used to support the decoding of the CGI behind measured pairs of physical cell identifiers and center frequencies, it can occur that more than one cell global identifier (per physical cell identifier) will be reported by the user equipment and this situation leads to the above mentioned PCI collision/confusion. Another reason for physical cell identifier collision/confusion could be that the mobile network operator configured non-unique pairs of physical cell identifiers and center frequencies in the eNodeB, because of non-perfect PCI-planning or optimization procedures. Still another reason might be that the online automatic neighbor relation function (ANR) is not switched off during the PCI optimization period, one of the most important input data source, the existing neighbor relations of a cell/eNodeB, can be extended continuously.

Due especially to these possible reasons, the following scenario of a physical cell identifier conflict can occur in real mobile networks: A target cell (e.g. the second cell 11 or also called cell B), having an assigned physical cell identifier information (e.g. "PCI (B)"), is measured or configured in the neighbor list of the serving cell 10 (or source cell A). E.g. due to non-perfect PCI-planning or optimization algorithms or the fact that the range of possible physical cell identifier values itself is limited (in case of LTE possible values include from 0 to 503 which might be insufficient in larger mobile networks), the physical cell identifier value of the second cell 11 (i.e. "PCI (B)") is reused, e.g. for the third cell 12, i.e. (at least in part) in the coverage area of the serving cell 10 (or source cell A). In such a situation of conflicting physical cell identifiers, the respective physical cell identifier information value ("PCI (B)") can be measured by a user equipment either transmitting from the second cell 11 (cell B) or from the third cell 12 (cell C). Due to the fact that this physical cell identifier information value (i.e. this "PCI (B)" value) is already known in the neighbor list of the serving cell 10 (source cell A), it is in the nature of the mobility solution, that the handover is triggered and the preparation started towards the second cell 11 (i.e. the radio cell corresponding to the already stored entry of the neighbor list of the serving cell 10 (cell A), i.e. the stored target cell B). In such a situation, the handover procedure will fail and in worst case finally a call drop will happen.

This PCI-reuse can also happen in the overlapping area of two (or more) mobile networks, e.g. in the area of a geographical border. Especially, if the PCI ranges or configured PCIs are not coordinated between these mobile network operators, the information about the configured and used PCIs of the other mobile network are simplify not known by the mobile network operator of the source cell. Hence PCI conflicts between these mobile network operators might appear.

Generally in situations of physical cell identifier conflicts, the present invention aims at avoiding to perform a measurement (or retrieval) of the cell global identifier information at every handover related event in order to verify the physical cell identifier information as this would require a considerably burden both on the mobile communication network and on the user equipments, especially in terms of increased battery drain and reduced throughput.

According to the present invention, in case that the following conditions are met:

that the user equipment 20 reports a downlink signal strength and/or downlink signal quality situation such that a handover is likely to be performed under control of the base station entity 111 towards a target radio cell based on indicating both the target physical cell identifier information and the target center frequency of the target radio cell, and additionally, that at least two radio cells of the further radio cells 11, 12, 13 have the identical target physical cell identifier information and the identical target center frequency such that a determination of the correct target radio cell among the at least two radio cells of the further radio cells 11, 12, 13 is not possible based on solely the target physical cell identifier information and the target center frequency of the target radio cell, the inventive method comprises the steps of:

in a first step, the base station entity 111—prior to executing the requested handover procedure—requests the user equipment 20 to decode the cell global identifier of the target radio cell, in a second step, subsequent to the first step, the user equipment 20 reports the cell global identifier to the base station entity 111, in a third step, subsequent to the second step, the base station entity 111 determines which one of the at least two radio cells of the further radio cells 11, 12, 13, having the target physical cell identifier information and the target center frequency, corresponds to the target radio cell, and initiates the handover procedure towards the target radio cell.

Especially, the first step is only executed if either of the following situations occur:

in case that the handover success rate associated with the target physical cell identifier information and the target center frequency is determined to be lower than a predetermined success rate threshold value, or in case that the target physical cell identifier is part of a predetermined set of physical cell identifiers , or in case that the target physical cell identifier and the corresponding center frequency is part of a predetermined set of physical cell identifiers and corresponding center frequencies, or in case that the target physical cell identifier and the corresponding center frequency is part of a predetermined set of physical cell identifiers and corresponding center frequencies and related to a specific public land mobile network, or in case that a field strength and/or network quality indicator measured by the user equipment 20 or serving base station entity 111 undercuts a predetermined first network quality threshold and/or in case that a timing advance indicator measured by the serving base station entity 111 and related to the connection to the user equipment 20 exceeds a predetermined first timing advance threshold, or in case that a field strength and/or network quality indicator measured by the user equipment 20 or serving base station entity 111 exceeds a predetermined second network quality threshold and/or in case that a timing advance indicator measured by the serving base station entity 111 and related to the connection to the user equipment 20 undercuts a predetermined second timing advance threshold, or in case that other functionalities regarding automatic neighbor relationship provides an indication that at least two radio cells of the further radio cells 11, 12, 13 have the identical target physical cell identifier information and the identical target center frequency such that a determination of the correct target radio cell among the at least two radio cells of the further radio cells 11, 12, 13 is not possible based on solely the target physical cell identifier information and the target center frequency of the target radio cell.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for improving overall network performance and/or overall quality of service of user equipments in a mobile communication network, wherein the mobile communication network comprises a core network and an access network, wherein the access network comprises at least one base station entity serving the user equipment, wherein a serving radio cell is associated with the base station entity corresponding to the radio coverage area of the base station entity, wherein a plurality of further radio cells are located in the vicinity of the serving radio cell, wherein the serving radio cell and each of the plurality of further radio cells use respective center frequencies, and wherein respective physical cell identifier information and respective unique cell global identifiers are assigned to the serving radio cell and to each of the plurality of further radio cells, the method comprising:

receiving, from the user equipment, a downlink signal strength and/or a downlink signal quality situation such that a handover is likely to be performed under control of the base station entity towards a target radio cell based on indicating both target physical cell identifier information and a target center frequency of the target radio cell;

determining that at least two radio cells of the plurality of further radio cells have physical cell identifier information identical to the target physical cell identifier information and center frequencies identical to the target center frequency such that a determination of the target radio cell from among the at least two radio cells of the plurality of further radio cells is not possible based solely on the target physical cell identifier information and the target center frequency of the target radio cell; and in response to the determining that the at least two radio cells of the plurality of further radio cells have identical physical cell identifier information and identical center frequencies such that a determination of the target radio cell from the at least two radio cells of the plurality of further radio cells is not possible based solely on the target physical cell identifier information and the target center frequency of the target radio cell:

requesting, by the base station entity in a first step prior to executing a requested handover procedure, that the user equipment decode a target cell global identifier of the target radio cell;

receiving, by the base station entity from the user equipment in a second step subsequent to the first step, the decoded target cell global identifier; and determining, by the base station entity based on the received decoded target cell global identifier in a third step subsequent to the second step which one of the at least two radio cells of the plurality of further radio cells corresponds to the target radio cell, and initiating the handover procedure towards the target radio cell.

2. The method according to claim 1, wherein the determining that the at least two radio cells of the plurality of further radio cells have identical physical cell identifier information and identical center frequencies such that a determination of the target radio cell from the at least two radio cells of the plurality of further radio cells is not possible based solely on the target physical cell identifier information and the target center frequency of the target radio cell comprises at least one of:

determining that the handover success rate associated with the target physical cell identifier information and the target center frequency is determined to be lower than a predetermined success rate threshold value, determining that the target physical cell identifier is part of a predetermined set of physical cell identifiers, determining that the target physical cell identifier and the corresponding center frequency is part of a predetermined set of physical cell identifiers and corresponding center frequencies, determining that the target physical cell identifier and the corresponding center frequency is part of a predetermined set of physical cell identifiers and corresponding center frequencies and related to a specific public land mobile network, determining that a field strength and/or network quality indicator measured by the user equipment or serving base station entity undercuts a predetermined first network quality threshold and/or in case that a timing advance indicator measured by the serving base station entity and related to the connection to the user equipment exceeds a predetermined first timing advance threshold, determining that a field strength and/or network quality indicator measured by the user equipment or serving base station entity exceeds a predetermined second network quality threshold and/or in case that a timing advance indicator measured by the serving base station entity and related to the connection to the user equipment undercuts a predetermined second timing advance threshold, determining that other functionalities regarding automatic neighbor relationship provides an indication that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell.

3. The method according to claim 1, wherein the method further comprises, prior to the first step:

recognizing or anticipating the situation that at least two radio cells of the further radio cells have the identical target physical cell identifier information and the identical target center frequency such that a determination of the correct target radio cell among the at least two radio cells of the further radio cells is not possible based on solely the target physical cell identifier information and the target center frequency of the target radio cell.

4. The method according to claim 1, wherein in case that at least two radio cells of the further radio cells had the identical target physical cell identifier information and the identical target center frequency at a first point in time but the confusion regarding the identical target physical cell identifier information and the identical target center frequency has been resolved at a second point in time subsequent to the first point in time, an execution of the first step is avoided despite a handover success rate associated with the target physical cell identifier information and the target center frequency being determined to be lower than a predetermined success rate threshold value.

5. The method according to claim 1, wherein the base station entity generates a list of potential target cells for handover procedures, the list of potential target cells comprising at least a subset of the further radio cells.

6. The method according to claim 5, wherein in case that the list of potential target cells for handover procedures comprises an entry corresponding to a radio cell belonging to an unsupported mobile communication network and having a physical cell identifier and a center frequency identical to one of the further radio cells, then either this entry of the list of potential target cells for handover procedures is changed to pointing to the one of the further radio cells, or a further entry of the list of potential target cells for handover procedures is generated pointing to the one of the further radio cells.

7. A system for improving overall network performance and/or overall quality of service of user equipments in a mobile communication network, wherein the system comprises:

a user equipment; and a mobile communication network comprising a core network and an access network, wherein the access network comprises a base station entity, wherein a serving radio cell is associated with the base station entity and corresponds to the radio coverage area of the base station entity, wherein a plurality of further radio cells are located in the vicinity of the serving radio cell, wherein the serving radio cell and the plurality of further radio cells each use a respective center frequencies, and wherein respective physical cell identifier information and respective unique cell global identifiers are assigned to the serving radio cell and to each of the plurality of further radio cells;
wherein the mobile communication network is configured to:
receive, from the user equipment, a downlink signal strength and/or a downlink signal quality situation such that a handover is likely to be performed under control of the base station entity towards a target radio cell based on indicating both the target physical cell identifier information and a target center frequency of the target radio cell, and additionally,
determine that at least two radio cells of the plurality of further radio cells have physical cell identifier information identical to the target physical cell identifier information and target center frequencies identical to the target center frequency of the target radio cell such that a determination of the target radio cell from among the at least two radio cells of the plurality of further radio cells is not possible based solely on the target physical cell identifier information and the target center frequency of the target radio cell, and
perform, in response to determining that the at least two radio cells of the plurality of further radio cells have identical physical cell identifier information and identical center frequencies such that a determination of the target radio cell from the at least two radio cells of the plurality of further radio cells is not possible based solely on the target physical cell identifier information and the target center frequency of the target radio cell, the following:
requesting, by the base station entity, prior to executing the requested handover procedure, that the user equipment decode a target cell global identifier of the target radio cell;
receiving, by the base station entity from the user equipment, the decoded target cell global identifier; and
determining, by the base station entity based on the received decoded target cell global identifier, which one of the at least two radio cells of the plurality of further radio cells corresponds to the target radio cell, and initiating the handover procedure towards the target radio cell.

8. The system according to claim 7, wherein the mobile communication network is configured to determine that the at least two radio cells of the plurality of further radio cells have identical physical cell identifier information and identical center frequencies such that a determination of the target radio cell from the at least two radio cells of the plurality of further radio cells is not possible based solely on the target physical cell identifier information and the target center frequency of the target radio cell by verifying at least one of the following conditions;
the handover success rate associated with the target physical cell identifier information and the target center frequency is lower than a predetermined success rate threshold value,
the target physical cell identifier is part of a predetermined set of physical cell identifiers,
the target physical cell identifier and the corresponding center frequency is part of a predetermined set of physical cell identifiers and corresponding center frequencies,
the target physical cell identifier and the corresponding center frequency is part of a predetermined set of physical cell identifiers and corresponding center frequencies and related to a specific public land mobile network,
a field strength and/or network quality indicator measured by the user equipment or serving base station entity undercuts a predetermined first network quality threshold and/or in case that a timing advance indicator measured by the serving base station entity and related to the connection to the user equipment exceeds a predetermined first timing advance threshold,
a field strength and/or network quality indicator measured by the user equipment or serving base station entity exceeds a predetermined second network quality threshold and/or in case that a timing advance indicator measured by the serving base station entity and related to the connection to the user equipment undercuts a predetermined second timing advance threshold, and
other functionalities regarding automatic neighbor relationship provides an indication that at least two radio cells of the farther radio cells have the identical target physical cell identifier information and the identical target center frequency such that a determination of the correct target radio cell among the at least two radio cells of the further radio cells is not possible based on solely the target physical cell identifier information and the target center frequency of the target radio cell.

9. The system according to claim 7, wherein the mobile communication network is configured such that the base station entity generates a list of potential target cells for handover procedures, the list of potential target cells comprising at least a subset of the further radio cells.

10. A non-transitory computer-readable medium having processor-executable instructions stored thereon, the processor-executable instructions, when executed, facilitate performance of a method for improving overall network performance and/or overall quality of service of user equipments in a mobile communication network, wherein the mobile communication network comprises a core network and an access network, wherein the access network comprises at least one base station entity serving the user equipment, wherein a serving radio cell is associated with the base station entity corresponding to the radio coverage area of the base station entity, wherein a plurality of further radio cells are located in the vicinity of the serving radio cell, wherein the serving radio cell and each of the plurality of further radio cells use respective center frequencies, and wherein respective physical cell identifier information and unique cell global identifiers are assigned to the serving radio cell and to each of the plurality of further radio cells, the method comprising:
receiving, from the user equipment, a downlink signal strength and/or a downlink signal quality situation such that a handover is likely to be performed under control of the base station entity towards a target radio cell based on indicating both target physical cell identifier information and a target center frequency of the target radio cell;
determining that at least two radio cells of the plurality of further radio cells have physical cell identifier information identical to the target physical cell identifier information and center frequencies identical to the target center frequency such that a determination of the target radio cell from among the at least two radio cells of the plurality of further radio cells is not possible based solely on the target physical cell identifier information and the target center frequency of the target radio cell; and in response to the determining that the at least two radio cells of the plurality of further radio cells have identical physical cell identifier information and identical center frequencies such that a determination of the target radio cell from the at least two radio cells of the plurality of further radio cells is not possible based solely on the target physical cell identifier information and the target center frequency of the target radio cell:

requesting, by the base station entity in a first step prior to executing a requested handover procedure, that the user equipment decode a target cell global identifier of the target radio cell;

receiving, by the base station entity from the user equipment in a second step subsequent to the first step, the decoded target cell global identifier; and determining, by the base station entity based on the received decoded target cell global identifier in a third step subsequent to the second step which one of the at least two radio cells of the plurality of further radio cells corresponds to the target radio cell, and initiating the handover procedure towards the target radio cell.

* * * * *